United States Patent
Aksu et al.

(10) Patent No.: US 12,206,959 B2
(45) Date of Patent: Jan. 21, 2025

(54) METHOD AND APPARATUS FOR SIGNALING MULTIPLE MEDIA DATA TYPES

(71) Applicant: Nokia Technologies Oy, Espoo (FI)

(72) Inventors: Emre Aksu, Tampere (FI); Miska Hannuksela, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/001,817

(22) PCT Filed: May 24, 2021

(86) PCT No.: PCT/IB2021/054495
§ 371 (c)(1),
(2) Date: Dec. 14, 2022

(87) PCT Pub. No.: WO2021/255550
PCT Pub. Date: Dec. 23, 2021

(65) Prior Publication Data
US 2023/0232082 A1   Jul. 20, 2023

Related U.S. Application Data

(60) Provisional application No. 63/040,938, filed on Jun. 18, 2020.

(51) Int. Cl.
*H04N 21/84* (2011.01)
*H04N 21/854* (2011.01)

(52) U.S. Cl.
CPC .......... *H04N 21/84* (2013.01); *H04N 21/854* (2013.01)

(58) Field of Classification Search
CPC ....... H04N 21/84; H04N 21/854; H04N 21/85
USPC ......................................................... 725/32
See application file for complete search history.

(56) References Cited

U.S. PATENT DOCUMENTS

| 2009/0119594 A1* | 5/2009 | Hannuksela | H04N 21/41407 715/723 |
| 2011/0202567 A1* | 8/2011 | Bach | G06F 16/637 707/784 |
| 2018/0146225 A1* | 5/2018 | Hannuksela | H04N 21/4402 |
| 2020/0021883 A1* | 1/2020 | Stockhammer | H04N 21/8456 |

OTHER PUBLICATIONS

"Information Technology—Coding Of Audio-Visual Objects—Part 12: ISO Base Media File Format", ISO/IEC 14496-12, Fifth edition, Dec. 15, 2015, 248 pages.

(Continued)

*Primary Examiner* — Adil Ocak
(74) *Attorney, Agent, or Firm* — McCarter & English, LLP

(57) ABSTRACT

A method, apparatus and computer program product are provided to signaling multiple media data types in a container file format, for example, ISOBMFF, in an efficient manner. In the context of a signaling method, media type definitions overloaded in an instance a plurality of media type definitions is present in compatible media type list, wherein a media type definition is associated with a media type. The method then indicates, using the compatible media type list, presence of a plurality of media types in a metadata or multimedia box. Corresponding apparatuses and computer program products are also provided.

20 Claims, 9 Drawing Sheets

52 — Associate a media item with a media item property, wherein the media item property indicates a media type to be used for the media item 54 — Signal the media type using the media item property

(56) References Cited

OTHER PUBLICATIONS

"Information technology—JPEG 2000 image coding system—Part 12: ISO base media file format", ISO/IEC FDIS 14496-12:2020(E), ISO/IEC 15444-12:2015(E), M19301, Feb. 20, 2015, 299 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.
"Information technology—High efficiency coding and media delivery in heterogeneous environments—Part 12: Image File Format", ISO/IEC 23008-12, First Edition, Dec. 2017, 82 pages.
"Text of ISO/IEC DIS 23090-10 Carriage of Visual Volumetric Video-based Coding Data ", Systems, ISO/IEC JTC 1/SC 29/WG 11, N19285, Jun. 1, 2020, 55 pages.
"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 181 pages.
"Information technology—Coded representation of immersive media—Part 10: Carriage of visual volumetric video-based coding data", ISO/IEC 23090-10, First Edition, May 2022, 15 pages.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information technology—Universal coded character set (UCS)", ISO/IEC 10646, Sixth edition, Dec. 2020, 9 pages.
"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.
International Search Report and Written Opinion received for corresponding Patent Cooperation Treaty Application No. PCT/IB2021/054495, dated Jul. 5, 2021, 13 pages.
Hannuksela et al., "[ISOBMFF]: Brand item property", Nokia, ISO/IEC JTC1/SC29/WG11 MPEG2018/M42574, Apr. 2018, 3 pages.
Vadakital et al., "File format options for HEVC coded still images", Nokia Corporation, ISO/IEC JTC1/SC29/WG 11 MPEG2013/M31372, Oct. 2013, 15 pages.
Aksu, "Technologies Under Consideration for Carriage of Point Cloud Data", Systems, ISO/IEC JTC1/SC29/WG11 MPEG2018/N18414, Mar. 2019, 40 pages.
Vadakital et al., "A grouping mechanism for the Image File Format (ISO/IEC 23008-12)", Nokia, 1SO/IEC JTC1/ SC29/WG11 MPEG2015/M35825, Feb. 2015, 5 pages.
Aksu et al., "[ISOBMFF] On meta box media handlers", Nokia , ISO/IEC JTC1/SC29/WG11 MPEG2020/M54430, Jun.-Jul. 2020, 2 pages.
Aksu et al., "[ISOBMFF] On meta box media handlers", Nokia , ISO/IEC JTC1/SC29/WG11 MPEG2020/M54430v2, Jun.-Jul. 2020, 2 pages.
Emre B. Aksu (Nokia et al. ) "(33.1) [V-PCC Systems] Text Improvements on Carriage of V-PCC Data", 130. MPEG Meeting; Apr. 20, 2020-Apr. 24, 2020; Alpbach; (Motion Picture Expert Group or ISO/IEC JTC1/SC29/WG11), Apr. 15, 2020.

\* cited by examiner

METHOD AND APPARATUS FOR SIGNALING MULTIPLE MEDIA DATA TYPES

RELATED APPLICATION

This application claims priority to PCT Application No. PCT/IB2021/054495, filed on May 24, 2021, which claims priority to U.S. Provisional Application No. 63/040,938, filed on Jun. 18, 2020, each of which is incorporated herein by reference in its entirety.

TECHNOLOGICAL FIELD

Example embodiments relates generally to compressing and decompressing media data and associated metadata, and, more particularly, signaling multiple media data types.

BACKGROUND

It is known to provide standardized formats for compression and decompression for streaming of media data.

BRIEF SUMMARY

An example method includes overloading media type definitions in an instance a plurality of media type definitions are present in a compatible media type list, wherein a media type definition is associated with a media type; and indicating, using the compatible media type list, presence of a plurality of media types in a metadata or multimedia box.

The method may further include, wherein the compatible media type definition list comprises a compatible brands list.

The method may further include, wherein the metadata or the multimedia box comprises a meta box.

The method may further include processing the plurality of media types based on a media type handler.

Another example method includes defining a media type handler extension box for extending a number of media types, wherein the media type handler extension box comprises a list of media types to which content of a metadata or a multimedia box complies with; and defining a first media type handler for identifying the media type handler extension box and causing processing of media items based on the list of media types.

The method may further include, wherein a box is a basic building block of a multimedia file format.

The method may further include, wherein the media type extension box comprises a HandlerExtensionBox.

The method may further include, wherein the list of media type comprises a list of handlers.

The method may further include, wherein the media type handler extension is identified using a four character code.

The method may further include, wherein the first media type handler comprises a main meta box handler.

The method may further include, wherein the metadata or a multimedia box comprises a meta box.

Yet another example method includes associating a media item with a media item property, wherein the media item property indicates a media type to be used for the media item; and signaling the media type using the media item property.

The method may further include defining a media type index for indicating an index of a media type handler box in a media type handler extension box.

The method may further include, wherein the media type index comprises a Handler_Index.

The method may further include resolving the media type for the media item using a media type handler box associated with a metadata or multimedia box in an instance the media item property is not associated with the media item.

The method may further include, wherein the index of the media type handler box starts from a value of 1, and wherein an index value of 0 indicates resolving the media type for the media item by using the media type handler box associated with a metadata or multimedia box.

The method may further include, wherein the media type handler box associated with the metadata or multimedia box comprises a meta box level HandlerBox, and wherein the metadata or multimedia box comprises a meta box.

The method may further include using a four-character code to indicate one or more of: the media type to use for the media item or the media item property.

The method may further include in an instance the media type is associated with a set of media items, forming an entity group comprising the set of media items; and associating the media item property to the entity group.

A still another method includes extending a media type handler box using extension mechanisms; and indicating, using the extended media type handler box, a list of compatible media types to which a structure or a format of a metadata or multimedia box conforms.

The method may further include, wherein the extension mechanisms comprise at least one of a version or flags.

The method may further include, wherein the extension mechanisms comprise ISOBMFF extension mechanisms.

The method may further include setting a primary media item for a compatible media type from the list of compatible media types; and indicating the primary media item for the compatible media types.

The method may further include, wherein the primary media item is set in a primary media item box.

The method may further include using flag fields of a media type property to indicate a media item as the primary media item for a media type.

The method may further include setting a flag in an entity group as '1' in an instance the entity group is used to indicate a media type for a set of media items.

The method may further include defining a first media item listed in the set of media items as a primary media item for the set of media items.

The method may further include, wherein the extended media type handler box for storing the media type comprises a media item identity of the primary media item.

The method may further include defining a data structure for indicating that a file comprises the extended media type handler.

A still another example method includes forming an entity group comprising a set of media items, in an instance a media type is associated with the set of media items; associating the entity group with a media item property, wherein the media item property indicates the media type to be used for the entity group or the set media items; and signaling the media type using the media item property.

The method may further include defining a media type index for indicating an index of a media type handler box in a media type handler extension box.

The method may further include, wherein the media type index comprises a Handler_Index.

The method may further include resolving the media type for the set of media items using a media type handler box associated with a metadata or multimedia box in an instance the media item property is not associated with the set of media items.

The method may further include, wherein the index starts from a value of 1, and wherein an index value of 0 indicates resolving the media type for the set of media items by using the media type handler box associated with a metadata or multimedia box.

The method may further include, wherein the media type handler box associated with the metadata or multimedia box comprises a meta box level HandlerBox, and wherein the metadata or multimedia box comprises a meta box.

The method may further include a four-character code to indicate one or more of: the media type to use for the set media items or the media item property.

A still another example method includes forming a plurality of sets of media items based on a plurality of media types associated with the plurality of sets of media items, wherein a distinct media type is associated with each set of media items of the plurality of media items; associating a plurality of media item properties with the plurality of sets of media items, wherein a media item property is associated with the each set of media items, and wherein the media item property indicates the media type to be used for the each set of media items; and signaling the plurality of media types using the plurality of media item properties.

The method may further include defining a media type index for indicating an index of a media type handler box in a media type handler extension box.

The method may further include, wherein the media type index comprises a Handler_Index.

The method may further include resolving the media type for the each set of media items using a media type handler box associated with a metadata or multimedia box in an instance the media item property is not associated with the each set of media items.

The method may further include, wherein the index starts from a value of 1, and wherein an index value of 0 indicates resolving the media type for the each set of media items by using the media type handler box associated with the metadata or multimedia box.

The method may further include, wherein the media type handler box associated with the metadata or multimedia box comprises a meta box level HandlerBox, and wherein the metadata or multimedia box comprises a meta box.

The method may further include using a four-character code to indicate one or more of: the media type to use for the set media items or the media item property.

The methods may further include, wherein a plurality of entity groups comprises the plurality of sets of media items.

An example apparatus includes processing circuitry; and at least one memory including computer program code, the at least one memory and the computer program code configured to, with the processing circuitry, cause the apparatus at least to perform: overload media type definitions in an instance a plurality of media type definitions are present in a compatible media type list, wherein a media type definition is associated with a media type; and indicate, using the compatible media type list, presence of a plurality of media types in a metadata or multimedia box.

The apparatus may further include, wherein the compatible media type definition list comprises a compatible brands list.

The apparatus may further include, wherein the metadata or the multimedia box comprises a meta box.

The apparatus may further include, wherein the apparatus further caused to process the plurality of media types based on a media type handler.

Another example apparatus includes processing circuitry; and at least one memory including computer program code, the at least one memory and the computer program code configured to, with the processing circuitry, cause the apparatus at least to perform: define a media type handler extension box for extending a number of media types, wherein the media type handler extension box comprises a list of media types to which content of a metadata or a multimedia box complies with; and define a first media type handler for identifying the media type handler extension box and causing processing of media items based on the list of media types.

The apparatus may further include, wherein a box is a basic building block of a multimedia file format.

The apparatus may further include, wherein the media type extension box comprises a HandlerExtensionBox.

The apparatus may further include, wherein the list of media type comprises a list of handlers.

The apparatus of may further include, wherein the media type handler extension is identified using a four character code.

The apparatus may further include, wherein the first media type handler comprises a main meta box handler.

The apparatus may further include, wherein the metadata or a multimedia box comprises a meta box.

A yet another example apparatus includes processing circuitry; and at least one memory including computer program code, the at least one memory and the computer program code configured to, with the processing circuitry, cause the apparatus at least to perform: associate a media item with a media item property, wherein the media item property indicates a media type to be used for the media item; and signal the media type using the media item property.

The apparatus may further include, wherein the apparatus is further caused to define a media type index for indicating an index of a media type handler box in a media type handler extension box.

The apparatus may further include, wherein the media type index comprises a Handler_Index.

The apparatus may further include, wherein the apparatus is further caused to resolve the media type for the media item using a media type handler box associated with a metadata or multimedia box in an instance the media item property is not associated with the media item.

The apparatus may further include, wherein the index of the media type handler box starts from a value of 1, and wherein an index value of 0 indicates resolving the media type for the media item by using the media type handler box associated with a metadata or multimedia box.

The apparatus may further include, wherein the media type handler box associated with the metadata or multimedia box comprises a meta box level HandlerBox, and wherein the metadata or multimedia box comprises a meta box.

The apparatus may further comprise using four-character code to indicate one or more of: the media type to use for the media item or the media item property.

The apparatus may further include, wherein the apparatus is further caused to perform in an instance the media type is associated with a set of media items, form an entity group comprising the set of media items; and associate the media item property to the entity group.

A still another example apparatus includes processing circuitry; and at least one memory including computer program code, the at least one memory and the computer program code configured to, with the processing circuitry, cause the apparatus at least to perform: extend a media type handler box using extension mechanisms; and indicate, using the extended media type handler box, a list of compatible media types to which a structure or a format of a metadata or multimedia box conforms.

The apparatus may further include, wherein the extension mechanisms comprise at least one of a version or flags.

The apparatus may further include, wherein the extension mechanisms comprise ISOBMFF extension mechanisms.

The apparatus may further include, wherein the apparatus is further caused to set a primary media item for a compatible media type from the list of compatible media types; and indicate the primary media item for the compatible media types.

The apparatus may further include, wherein the primary media item is set in a primary media item box.

The apparatus may further include wherein the apparatus further caused to use flag fields of a media type property to indicate a media item as the primary media item for a media type.

The apparatus may further include wherein the apparatus is further caused to set a flag in an entity group as '1' in an instance the entity group is used to indicate a media type for a set of media items.

The apparatus may further include, wherein the apparatus is further caused to define a first media item listed in the set of media items as a primary media item for the set of media items.

The apparatus may further include, wherein the extended media type handler box for storing the media type comprises a media item identity of the primary media item.

The apparatus may further include, wherein the apparatus is further caused to define a data structure for indicating that a file comprises the extended media type handler.

A still another example apparatus includes processing circuitry; and at least one memory including computer program code, the at least one memory and the computer program code configured to, with the processing circuitry, cause the apparatus at least to perform: form an entity group comprising a set of media items, in an instance a media type is associated with the set of media items; associate the entity group with a media item property, wherein the media item property indicates the media type to be used for the entity group or the set media items; and signal the media type using the media item property.

The apparatus may further include, wherein the apparatus is further caused to define a media type index for indicating an index of a media type handler box in a media type handler extension box.

The apparatus may further include, wherein the media type index comprises a Handler_Index.

The apparatus may further include, wherein the apparatus is further caused to resolve the media type for the set of media items using a media type handler box associated with a metadata or multimedia box in an instance the media item property is not associated with the set of media items.

The apparatus may further include, wherein the index starts from a value of 1, and wherein an index value of 0 indicates resolving the media type for the set of media items by using the media type handler box associated with a metadata or multimedia box.

The apparatus may further include, wherein the media type handler box associated with the metadata or multimedia box comprises a meta box level HandlerBox, and wherein the metadata or multimedia box comprises a meta box.

The apparatus may further include, wherein the apparatus is further caused to use a four-character code to indicate one or more of: the media type to use for the set media items or the media item property.

A still another example apparatus includes processing circuitry; and at least one memory including computer program code, the at least one memory and the computer program code configured to, with the processing circuitry, cause the apparatus at least to perform form a plurality of sets of media items based on a plurality of media types associated with the plurality of sets of media items, wherein a media type is associated with each set of media items of the plurality of media items; associate a plurality of media item properties with the plurality of sets of media items, wherein a media item property is associated with the each set of media items, and wherein the media item property indicates the media type to be used for the each set of media items; signal the plurality of media types using the plurality of media item properties.

The apparatus may further include, wherein the apparatus is further caused to define a media type index for indicating an index of a media type handler box in a media type handler extension box.

The apparatus may further include, wherein the media type index comprises a Handler_Index.

The apparatus may further include, wherein the apparatus is further caused to resolve the media type for the each set of media items using a media type handler box associated with a metadata or multimedia box in an instance the media item property is not associated with the each set of media items.

The apparatus may further include, wherein the index starts from a value of 1, and wherein an index value of 0 indicates resolving the media type for the each set of media items by using the media type handler box associated with the metadata or multimedia box.

The apparatus may further include, wherein the media type handler box associated with the metadata or multimedia box comprises a meta box level HandlerBox, and wherein the metadata or multimedia box comprises a meta box.

The apparatus may further include, wherein the apparatus is further caused to use a four-character code to indicate one or more of: the media type to use for the set media items or the media item property.

The apparatuses may further include, wherein a plurality of entity groups comprises the plurality of sets of media items.

A still another example apparatus includes means for forming an entity group comprising a set of media items, in an instance a media type is associated with the set of media items; means for associating the entity group with a media item property, wherein the media item property indicates the media type to be used for the entity group or the set media items; and means for signaling the media type using the media item property.

A still another example apparatus includes means for forming a plurality of sets of media items based on a plurality of media types associated with the plurality of sets of media items, wherein a media type is associated with each set of media items of the plurality of media items; means for associating a plurality of media item properties with the plurality of sets of media items, wherein a media item property is associated with the each set of media items, and wherein the media item property indicates the media type to be used for the each set of media items; means for signaling the plurality of media types using the plurality of media item properties.

An example computer program product includes a non-transitory computer readable storage medium having program code portions stored thereon, the program code portions configured, upon execution, to: form an entity group comprising a set of media items, in an instance a media type is associated with the set of media items; associate the entity group with a media item property, wherein the media item property indicates the media type to be used for the entity group or the set media items; and signal the media type using the media item property.

An another example computer program product includes a non-transitory computer readable storage medium having program code portions stored thereon, the program code portions configured, upon execution, to: form a plurality of sets of media items based on a plurality of media types associated with the plurality of sets of media items, wherein a media type is associated with each set of media items of the plurality of media items; associate a plurality of media item properties with the plurality of sets of media items, wherein a media item property is associated with the each set of media items, and wherein the media item property indicates the media type to be used for the each set of media items; signal the plurality of media types using the plurality of media item properties.

BRIEF DESCRIPTION OF THE SEVERAL VIEWS OF THE DRAWINGS

Figure 1:
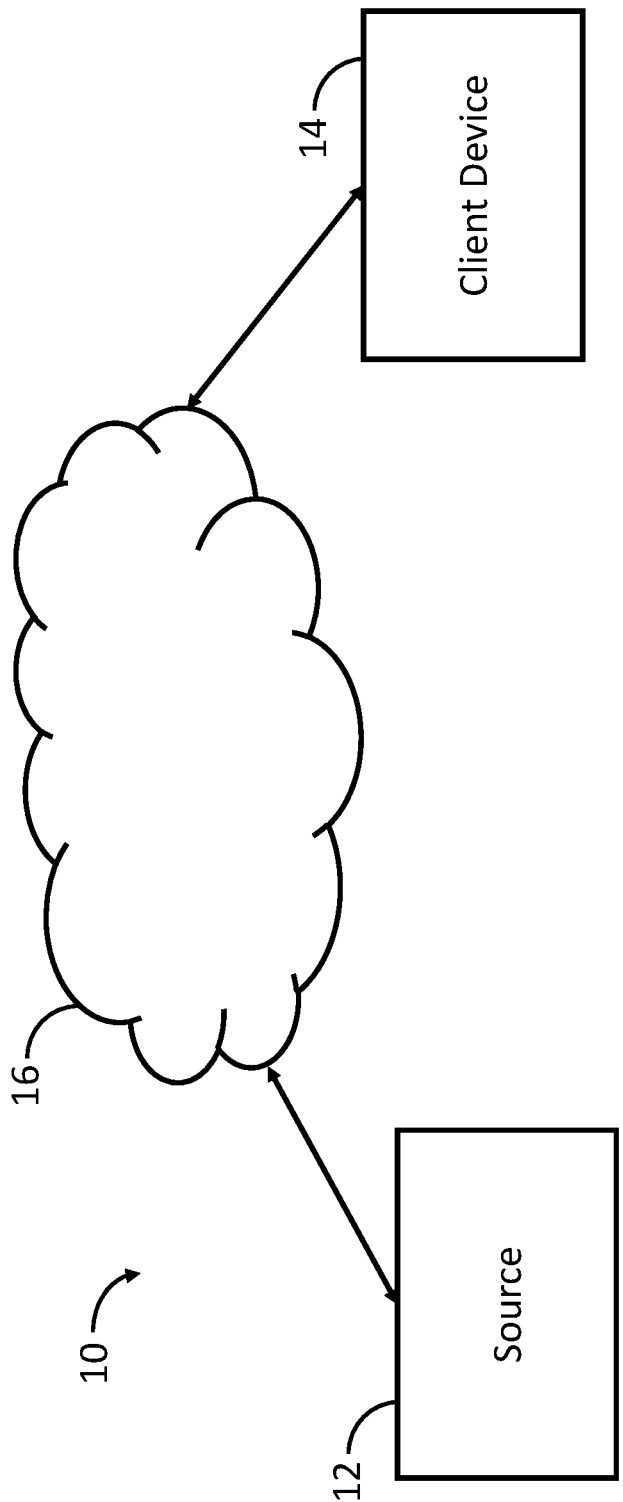
Figure 2:
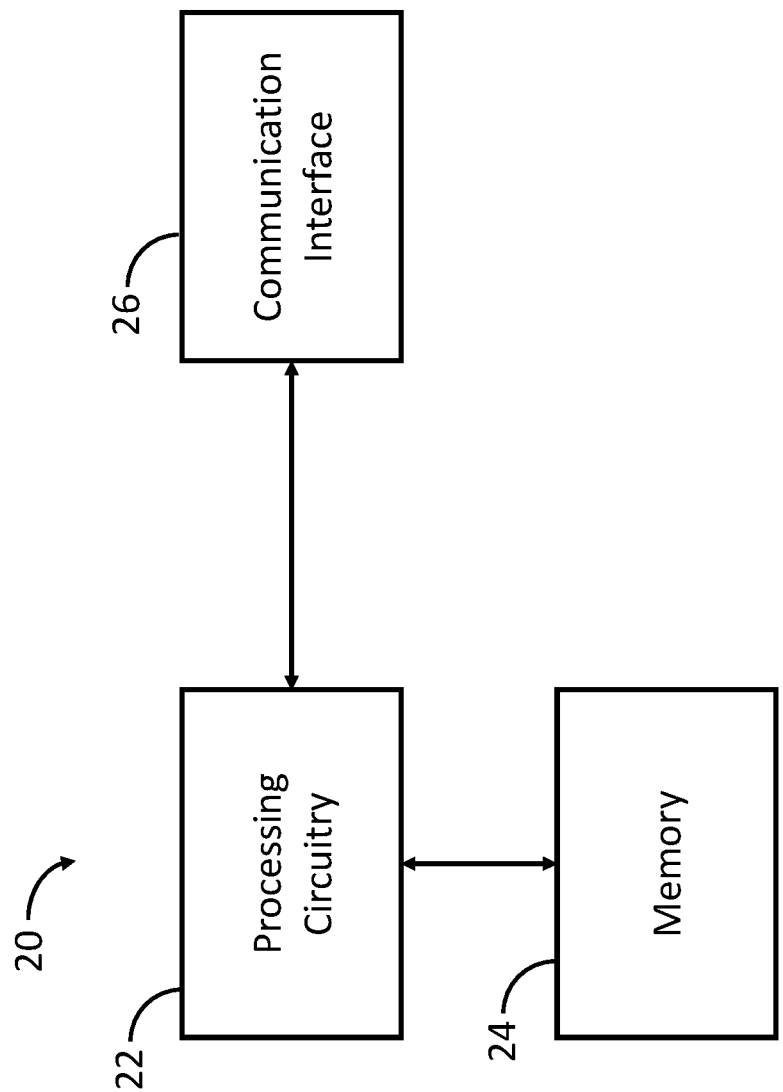
Figure 3:
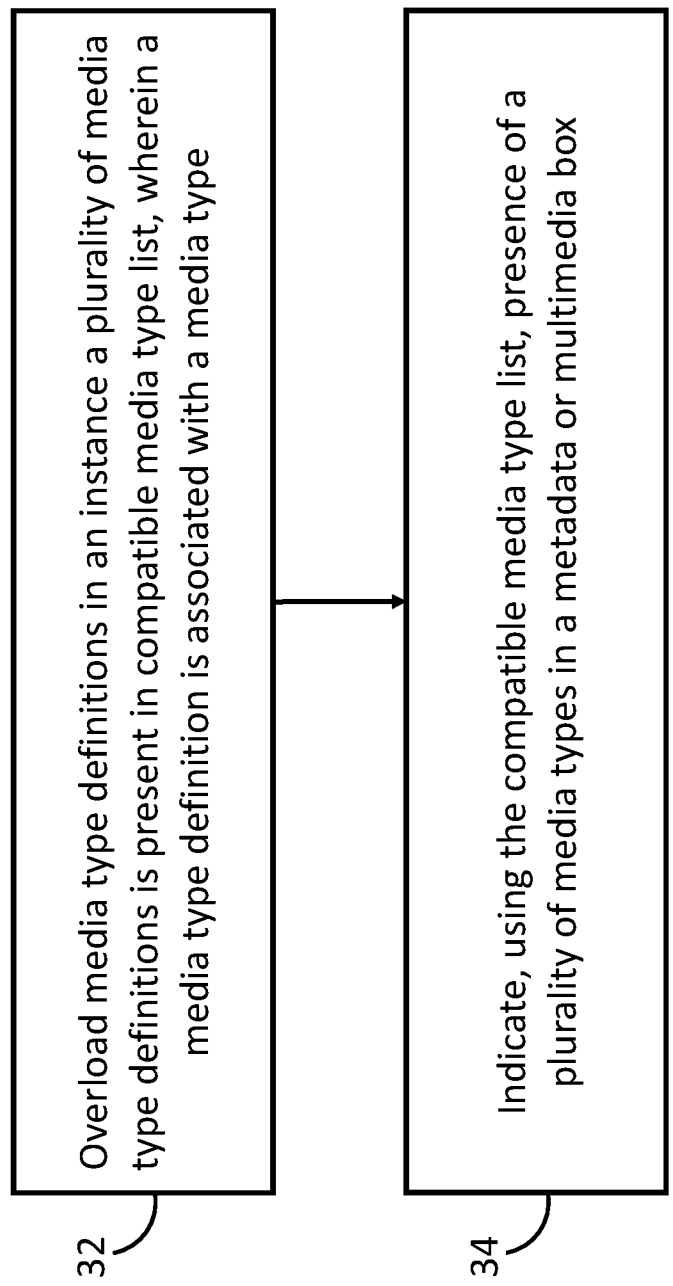
Figure 4:
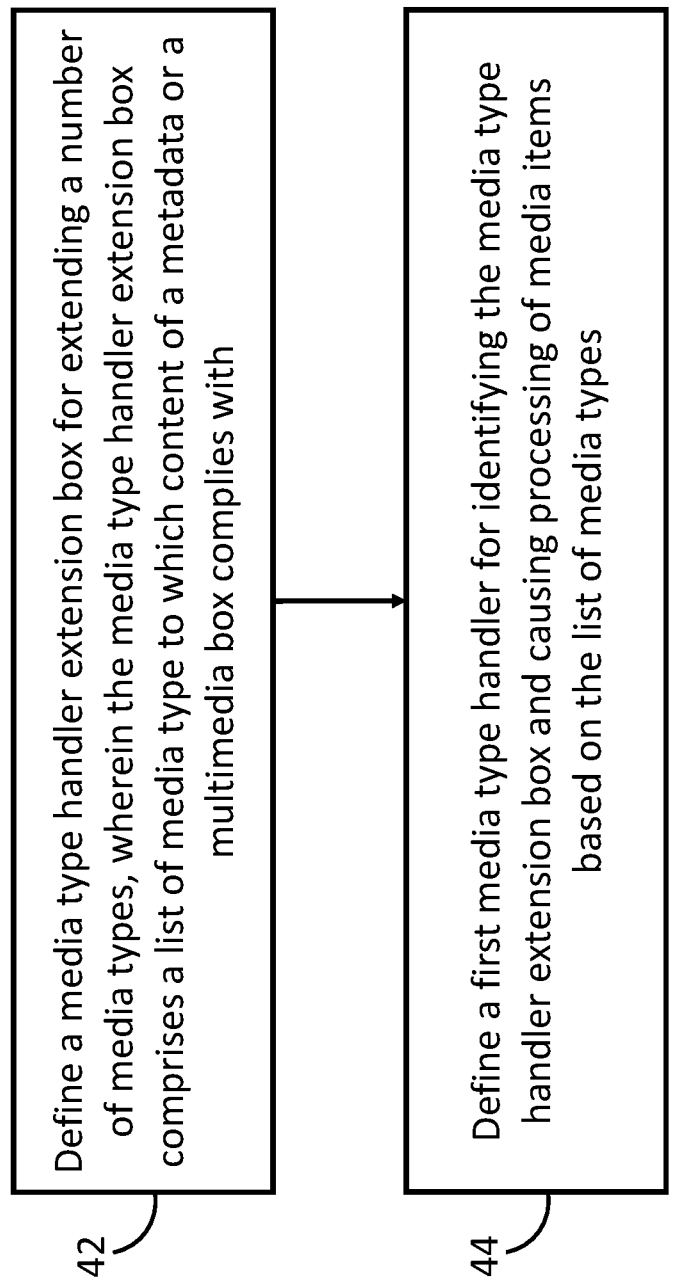
Figure 5:
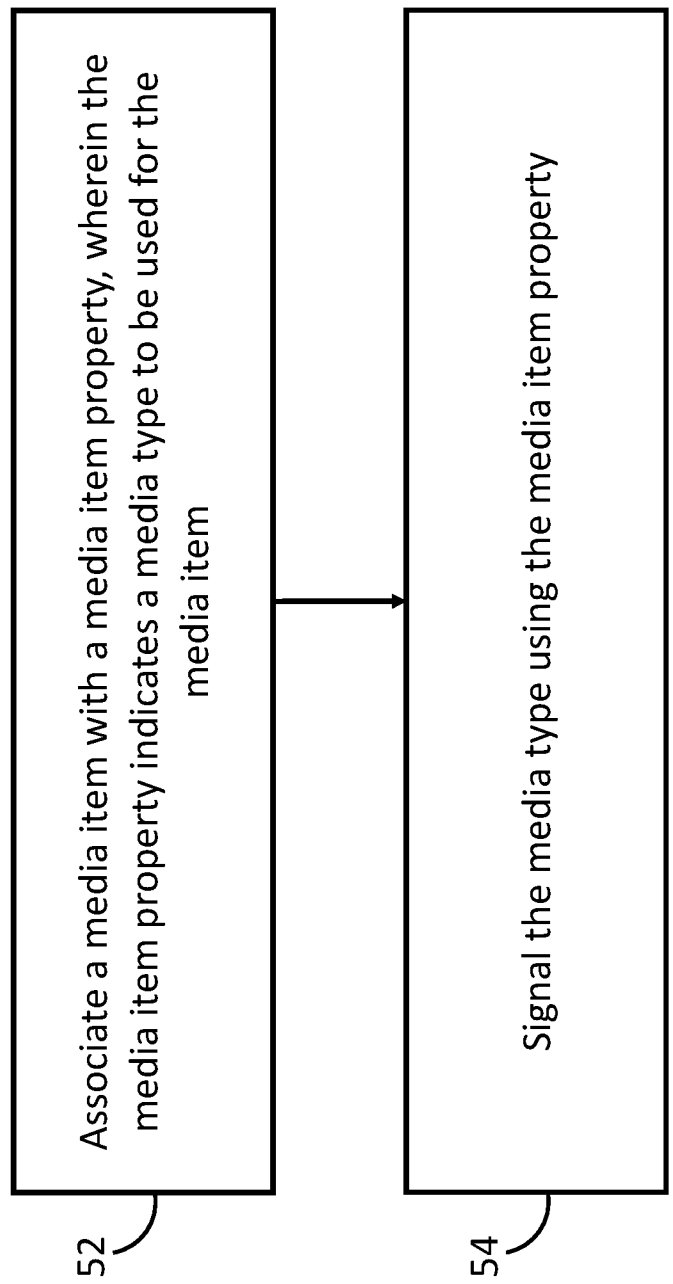
Figure 6:
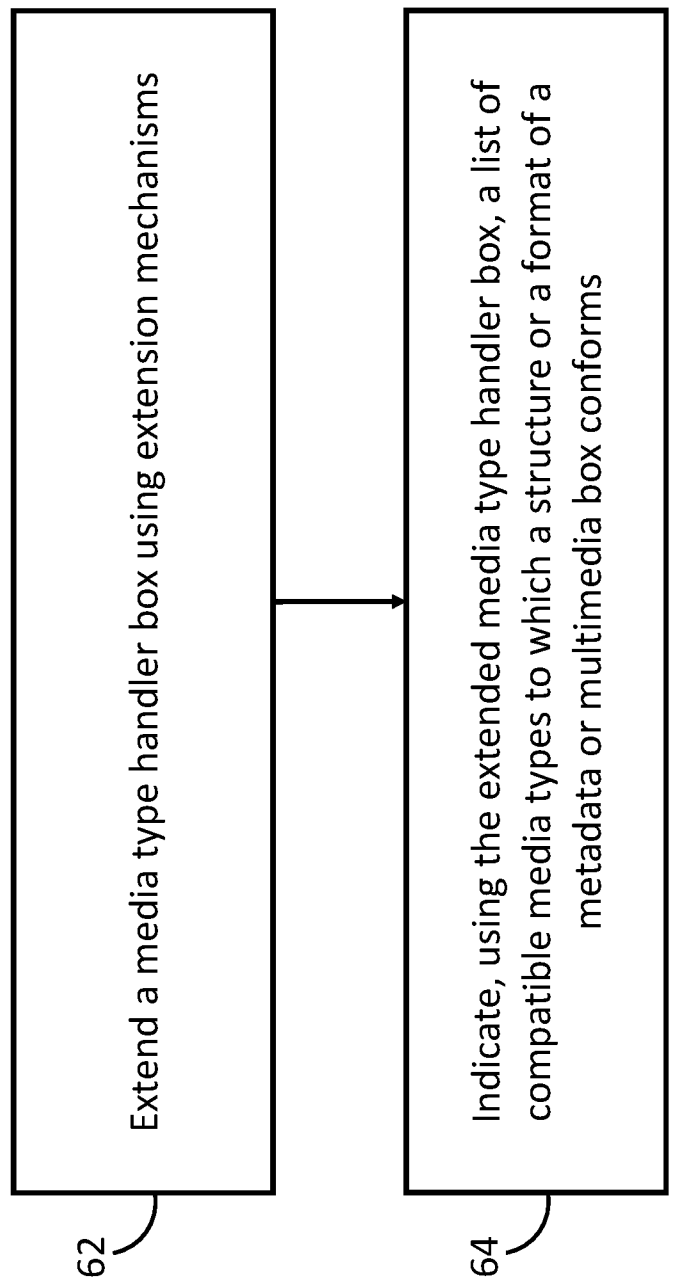
Figure 7:
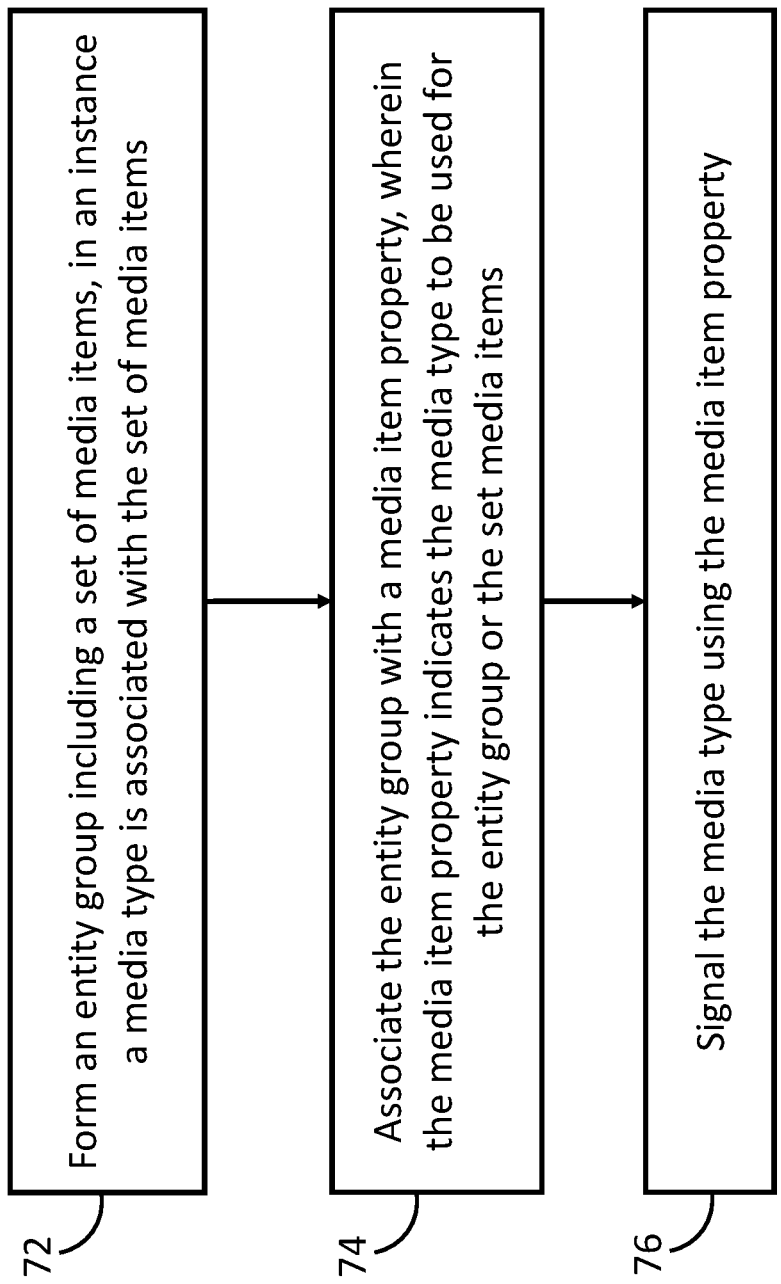
Figure 8:
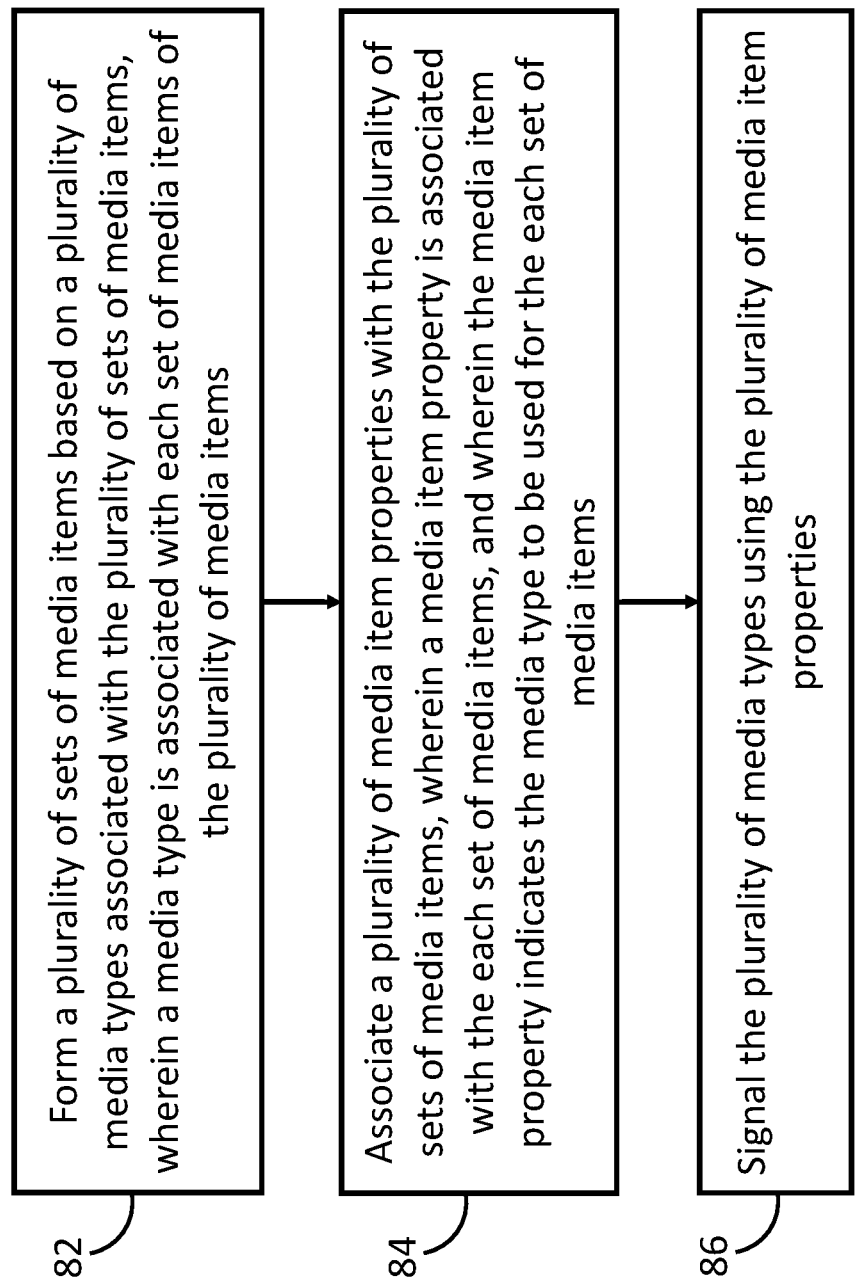
Figure 9:
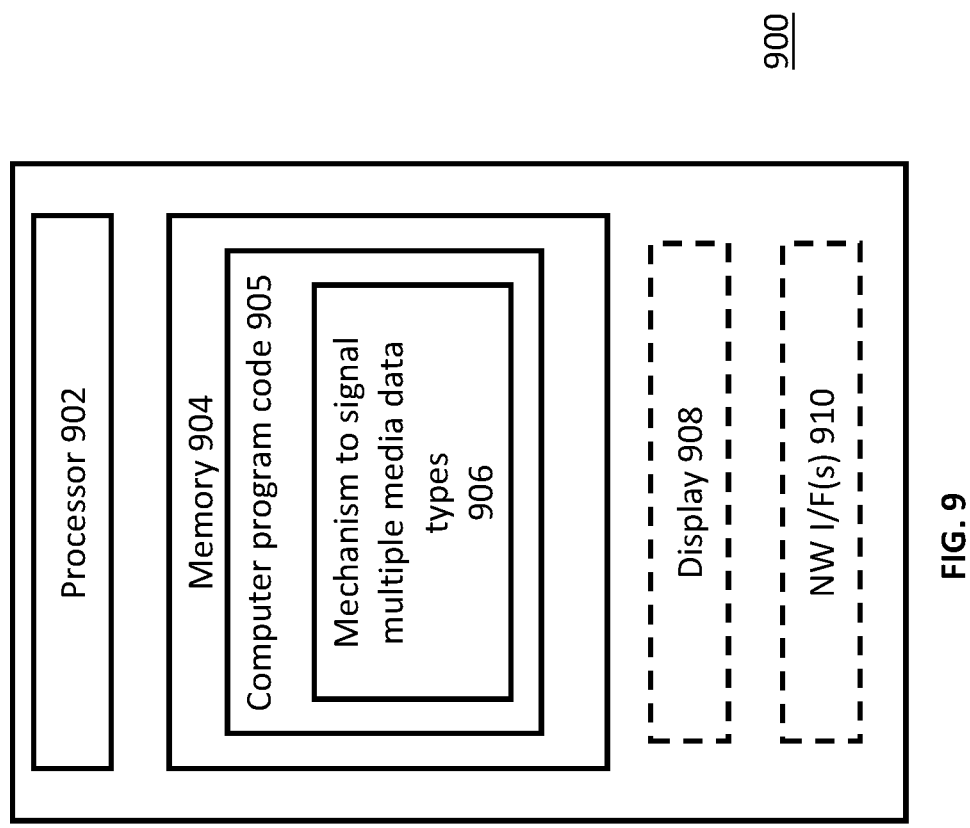

Having thus described certain example embodiments in general terms, reference will now be made to the accompanying drawings, which are not necessarily drawn to scale, and wherein:

FIG. 1 illustrates a system configured to support streaming of media data from a source to a client device;

FIG. 2 is a block diagram of an apparatus that may be specifically configured in accordance with an example embodiment;

FIG. 3 is a flowchart illustrating the operations performed, such as by the apparatus of FIG. 2, in conjunction with signaling multiple media types, in accordance with an example embodiment;

FIG. 4 is a flowchart illustrating the operations performed, such as by the apparatus of FIG. 2, in conjunction with signaling multiple media types, in accordance with another example embodiment;

FIG. 5 is a flowchart illustrating the operations performed, such as by the apparatus of FIG. 2, in conjunction with signaling multiple media types, in accordance with yet another example embodiment;

FIG. 6 is a flowchart illustrating the operations performed, such as by the apparatus of FIG. 2, in conjunction with signaling multiple media types, in accordance with still another example embodiment;

FIG. 7 is a flowchart illustrating the operations performed, such as by the apparatus of FIG. 2, in conjunction with signaling multiple media types, in accordance with still another example embodiment;

FIG. 8 is a flowchart illustrating the operations performed, such as by the apparatus of FIG. 2, in conjunction with signaling multiple media types, in accordance with still another example embodiment; and FIG. 9 is block diagram of an apparatus configured to implement the mechanism for signaling multiple media type, in accordance with an embodiment.

DETAILED DESCRIPTION

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CABAC context-adaptive binary arithmetic coding
CDMA code-division multiple access
CE core experiment
CU central unit
DASH dynamic adaptive streaming over HTTP
DCT discrete cosine transform
DSP digital signal processor
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
gNB (or gNodeB) base station for 5G/NR, for example, a node providing NR user plane and control plane protocol terminations towards the UE, and connected via the NG interface to the 5GC
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
HVEC high efficiency video coding
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
ONNX Open Neural Network eXchange
PB protocol buffers
PC personal computer
PDA personal digital assistant
PDCP packet data convergence protocol
PHY physical layer
PID packet identifier
PLC power line communication
PSNR peak signal-to-noise ratio
RAM random access memory
RAN radio access network
RFC request for comments
RFID radio frequency identification
RLC radio link control
RRC radio resource control
RRH remote radio head
RU radio unit
Rx receiver
SDAP service data adaptation protocol
SGW serving gateway
SMF session management function
SMS short messaging service
st(v) null-terminated string encoded as UTF-8 characters as specified in ISO/IEC 10646
SVC scalable video coding
S1 interface between eNodeB s and the EPC
TCP-IP transmission control protocol-internet protocol
TDMA time divisional multiple access
trak TrackBox
TS transport stream
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
v3c visual volumetric video-based coding
UTF-8 8-bit Unicode Transformation Format
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to provide signaling of multiple media type associated with a media file format, for example, ISOBMFF, such as in conjunction with the streaming of media data. In some embodiments, media data may be referred to as media data item, media item, or item. In this regard, the media data and associated metadata are contained in respective boxes.

The method and apparatus of an example embodiment may be utilized in a wide variety of systems that rely upon the compression and decompression of media data and the associated metadata. In some embodiments, however, the method and apparatus are configured to signal or stream multiple media data types and associated metadata from a source via a content delivery network to a client device, at which point the compressed media data and associated metadata is decompressed. In this regard, FIG. 1 depicts an example of such a system 10 that includes a source 12 of media data and associated metadata. The source may be, in one embodiment, a server. However, the source may be embodied in other manners if so desired. The source is configured to stream boxes containing the media data and associated metadata that have been compressed to a client device 14. The client device may be embodied by a media player, a multimedia system, a video system, a smart phone, a mobile telephone or other user equipment, a personal computer, a tablet computer or any other computing device configured to receive and decompress the media data and associated metadata. In the illustrated embodiment, compressed boxes of media data and compressed boxes of metadata, containing multiple media data types, are streamed via a network 16, such as any of a wide variety of types of wireless networks and/or wireline networks. The client device is configured to receive the compressed boxes containing the media and the metadata, containing multiple media data type and to provide for decompression of the boxes.

In an example embodiment, the source 12, such as a server, is configured to signal or stream boxes containing multiple media data types, for example handlers. In other embodiments, the source, such as the server, receives the media data and the associated metadata in a form that has already been compressed. In either instance, the client device 14 may be configured to decompress the media data and the boxes containing the associated metadata or the client device may be configured to provide the compressed boxes containing the media data and the compressed boxes containing the associated metadata to another apparatus that, in turn, is configured to decompress the compressed boxes containing the media data and the boxes containing the associated metadata. As a result, of the compression of a sequence of boxes containing media data and a sequence of boxes containing the associated metadata in accordance with an example embodiment, the system 10 of FIG. 1 may be configured to provide improved association for media data type (for example, the correct media handlers) with the media data items in a metadata box (for example, a 'meta box'). Thereby improving performance of streaming a compressed representation of the media data and the associated metadata, thereby improving the efficiency with which the media data and associated metadata are streamed.

An apparatus 20 is provided in accordance with an example embodiment as shown in FIG. 2. In one embodiment, the apparatus of FIG. 2 may be embodied by the source 12, an encoder which in turn, may be embodied by a server, that is configured to stream a compressed representation of the media data and associated metadata. In an alternative embodiment, the apparatus may be embodied by the client device 14, such as a decoder or player which may be embodied, for example, by any of the various computing devices described above. In either of these embodiments and as shown in FIG. 2, the apparatus of an example embodiment includes, is associated with or is in communication with a processing circuitry 22, one or more memory devices 24, a communication interface 26 and optionally a user interface.

The processing circuitry 22 may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms, methods, and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 20 may optionally include a user interface that may, in turn, be in communication with the processing circuitry 22 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., a memory device 24, and/or the like).

ISO Base Media File Format (ISOBMFF, ISO/IEC 14496-12)

There are several file formats that have been standardized for example, ISO base media file format (ISO/IEC 14496-12, which may be abbreviated ISOBMFF), moving picture experts group (MPEG)-4 file format (ISO/IEC 14496-14, also known as the MP4 format), file format for network abstraction layer (NAL) unit structured video (ISO/IEC 14496-15) and 3GPP file format (3GPP TS 26.244, also known as the 3GP format). ISOBMFF is the base for derivation of all the above-mentioned file formats except for the ISOBMFF itself.

Some concepts, structures, and specifications of ISOBMFF are described below as an example of a container file format, based on which some embodiments may be implemented. The feature of the embodiments of the invention are not limited to ISOBMFF, but rather the description is given for one possible basis on top of which various embodiments may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes. Each box is identified by a four character code (4CC) and starts with a header which informs about the type and size of the box.

Many files formatted according to the ISO base media file format start with a file type box, also referred to as 'FileTypeBox' or the 'ftyp' box. The 'ftyp' box contains information of the brands labeling the file. The 'ftyp' box includes one major brand indication and a list of compatible brands. The major brand identifies the most suitable file format specification to be used for parsing the file. The compatible brands indicate which file format specifications and/or conformance points the file conforms to. It is possible that a file is conformant to multiple specifications. All brands indicating compatibility to these specifications should be listed, so that a reader only understanding a subset of the compatible brands can get an indication that the file can be parsed. Compatible brands also give a permission for a file parser of a particular file format specification to process a file containing the same particular file format brand in the 'ftyp' box. A file player may check if the 'ftyp' box of a file comprises brands it supports, and may parse and play the file only if any file format specification supported by the file player is listed among the compatible brands.

In files conforming to the ISO base media file format, the media data may be provided in one or more instances of 'MediaDataBox' ('mdat') and the 'MovieBox' ('moov') may be used to enclose the metadata for timed media. In some cases, for a file to be operable, both of the 'mdat' and 'moov' boxes may be required to be present. The 'moov' box may include one or more tracks, and each track may reside in one corresponding 'TrackBox' ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

Files conforming to the ISOBMFF may contain any non-timed objects, referred to as items, meta items, or metadata items, in a 'meta box' (fourCC: 'meta'), which may also be called 'MetaBox'. While the name of the 'meta box' refers to metadata, items can generally contain metadata or media data. The 'meta box' may reside at the top level of the file, within a movie box (fourCC: 'moov'), and within a track box (fourCC: 'trak'), but at most one meta box may occur at each of the file level, movie level, or track level. The 'meta box' may be required to contain a 'hdlr' box indicating the structure or format of the 'meta box' contents. The 'meta box' may list and characterize any number of items that can be referred and each one of them can be associated with a file name and are uniquely identified with the file by item identifier ('item_id') which is an integer value. The metadata items may be for example stored in the 'idat' box of the 'meta box' or in an 'mdat' box or reside in a separate file. If the metadata is located external to the file then its location may be declared by the 'DataInformationBox' (fourCC: 'dinf'). In the specific case that the metadata is formatted using XML syntax and is required to be stored directly in the 'MetaBox', the metadata may be encapsulated into either the 'XMLBox' (fourCC: 'xml') or the 'BinaryXMLBox' (fourcc: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

In ISOBMFF, 'HandlerBox' within a 'MediaBox' declares media type of the track, and thus the process by which the media-data in the track is presented. For example, a format for which the decoder delivers video would be stored in a video track, identified by being handled by a video handler. The documentation of the storage of a media format identifies the media type which that format uses.

'HandlerBox' when present within a 'MetaBox', declares the structure or format of the 'MetaBox' contents. The 'MetaBox' may also be referred to as 'meta box' in some embodiments. There is a general handler for metadata streams of any type; the specific format is identified by the sample entry, as for video or audio, for example.

Entity grouping in ISOBMFF enables grouping of both tracks and items in the same group. The syntax of 'EntityToGroupBox' in ISOBMFF is as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
```

'group_id' is a non-negative integer assigned to the particular grouping that may not be equal to any 'group_id' value of any other 'EntityToGroupBox', any 'item_ID' value of the hierarchy level (file, movie. or track) that contains the 'GroupsListBox', or any 'track_ID' value (when the 'GroupsListBox' is contained in the file level). 'num_entities_in_group' specifies the number of 'entity_id' values mapped to this entity group. 'entity_id' is resolved to an item, when an item with 'item_ID' equal to 'entity_id' is present in the hierarchy level (file, movie or track) that contains the 'GroupsListBox', or to a track, when a track with 'track_ID' equal to 'entity_id' is present and the 'GroupsListBox' is contained in the file level.

High Efficiency Image File Format (HEIF, ISO/IEC 23008-12)

The high efficiency image file format (HEIF) is a standard developed by the moving picture experts group (MPEG) for storage of images and image sequences. HEIF includes a rich set of features building on top of the widely used ISO Base Media File Format (ISOBMFF), making HEIF featurewise superior compared to other image file formats.

In HEIF, a handler type of 'pict' indicates several media content constraints and structural rules to the contents of the Meta Box.

Carriage of V3C Content (ISO/IEC 23090-10)

Carriage of visual volumetric video-based coding (V3C) data specification defines how point cloud coded non-timed media representations could be carried in ISOBMFF compatible files. Such nontied media items are stored in the file level 'meta box' with a handler type of 'v3ch'.

In ISOBMFF, media data can be logically represented as timed and non-timed. Non-timed media can be stored in an ISOBMFF box called 'meta box' (with a 4CC code 'meta').

The 'meta box' is defined in ISOBMFF (ISO/IEC 14496-12) as follows a common base structure is used to contain general untimed metadata. This structure is called the Meta box as it was originally designed to carry metadata, for example, data that is annotating other data. However, it is now used for a variety of purposes including the carriage of data that is not annotating other data, especially when present at 'file level'.

The 'meta box' is required to contain a handler in its 'HandlerBox' (4CC code 'hdlr') indicating the structure, format and constraints applied on the contents of 'meta box'. The following properties apply to 'meta box' and related data structures and contained specifications:

'Meta box' can be present at file level, track level or both. there can be only one meta box at a particular level (file or track)

'Meta box' contains a handler type which is defined in the 'HandlerBox' ('hdlr'). There can be only one 'hdlr' box in a 'meta box'.

In HEIF (ISO/IEC 23008-12), 'meta box' mainly carries image items (handler type='pict')

In OMAF (ISO/IEC 23090-2), it can also carry omnidirectional image items (handler type='pict')

In video point cloud coding (V-PCC) file format (ISO/IEC 23090-10), 'meta box' mainly carries non-timed V-PCC encoded items, but may also carry image items (handler type='v3ch')

Since there can be only one handler type in a meta box, mixing different non-timed media types becomes cumbersome to handle. For example, if the handler type is 'v3ch' (V3C video-coded point cloud media type) and if the file's compatible brands list contains 'heic', the following media types may be present in the 'meta box':

An image item which is high efficiency video codec (HEVC) encoded, as a primary image item is required is required for HEVC A V3C non-timed item (e.g. a static point cloud)

This may be in contrast to the notion of having a 'handler' which can handle a particular media type. In this particular case, the handler ('v3ch') may need to operate on multiple media types (e.g. HEVC encoded image item and non-timed V-PCC item).

This design, issues from implementations perspective due to intersections of media types to be 'handled' (e.g. a non-timed V3C item handler should not handle HEVC image items and vice-versa).

Since ISOBMFF allows convergence of different media types in the same container (e.g. images, videos, omnidirectional videos and omnidirectional images as well as static and non-static point clouds), it is critical that correct media handlers are associated to the media items in the 'meta box'.

Various embodiments propose following methods to solve multiple media type ambiguity (for example, methods to solve the multi-handler ambiguity in ISOBMFF files):

Overloading the compatible brand definition

Defining a new handler box which lists the required handler types

Signaling of media handlers via the item properties that could provide even finer granularity in relating the 'meta box' contents to media handlers.

Extending the 'HandlerBox' to indicate compatible handler types

Overloading Compatible Brand Definitions

Overload compatible brand definitions when multiple brands are present in the compatible brands list. The multiple brands may indicate the presence of different media types in a 'meta box'. In an embodiment, to overload the compatible brand definitions, following operations may be performed:

define a new media type; and list the new media type in the list of compatible media types when such a new media type indicates the presence of media entity-wise (e.g. item or track) media handler types, where such media types are signaled as 4 character codes, and where such media types can be brands and listed in compatible brands list This embodiment may require a handler to be a 'super set' media type handler (for example, handle multiple media types) in order to properly process media items in a 'meta box'. For example, V3C handler may needs to handle image items or pass them to proper handlers indirectly.

Define a New Box to Indicate the List of Possible Media Handlers

In this embodiment, a new box called 'HandlerExtensionBox' is defined to extend the number of possible media handlers.

In an embodiment, HandlerExtensionBox is defined as follows:

```
aligned(8) class HandlerExtensionBox extends FullBox('hdle',
version = 0, 0)
{
  HandlerBox HandlerBoxes[ ];
}
```

Where HandlerBox is defined as follows (same as in ISO/IEC 14496-12):

```
aligned(8) class HandlerBox extends FullBox('hdlr',
version = 0, 0)
    unsigned int(32)pre_defined = 0;
    unsigned int(32)handler_type;
    const unsigned int(32)[3]   reserved = 0;
    utf8string   name;
}
```

'handler_type' indicates the 4CC code which could be used to identify which media handler to use for an item.

Name may indicate a human-readable name of the media handler.

In an embodiment, 'HandlerExtensionBox' may follow the 'HandlerBox' of the 'meta box' as a companion box and define additional media handlers which are required to correctly parse and read the contents of the 'meta box'.

'HandlerExtensionBox' within a 'MetaBox' declares additional media types present in the 'MetaBox'. For example, a non-timed volumetric media item may be present in a 'MetaBox' together with a 2D encoded image item.

'HandlerBoxes' may be a list of media handlers of type 'HandlerBox'.

A 'hdle' box may indicate a list of handlers which the contents of the 'meta box' comply with. In an embodiment, 'hdle' may be the four character code (4CC) for a 'HandlerExtensioBox'.

In this embodiment, there may be a 'main meta box handler', and this handler shall recognize the 'hdle' box and then get ready to process items which may need to be handled more properly by the listed handlers.

Signaling of Media Handlers Via the Item Properties

In this embodiment, each item may be associated with a particular item property which may indicate the exact handler type to use for that particular item. In an embodiment, the handler property may be defined as follows:

```
aligned(8) class HandlerProperty extends ItemFullProperty('hdlp',
version, flags)
{
```

```
  unsigned int handler_index;
}
```

'handler_index' indicates the index of the 'HandlerBox' in the 'HandlerExtensionBox'. In an embodiment, index starts from 1, which may indicate the first listed 'HandlerBox' in the 'HandlerExtensionBox'. An index with value of 0 may indicate the 'HandlerBox' at 'meta box' level.

This property, when associated with an item, may declare the media type handler to be used. When associated with an item, it may override the media handler information which is defined in the HandlerBox of the MetaBox inside which the item is present.

If this property is not associated to an item via 'ipma' item-property association mechanism, then the 'meta box' level 'HandlerBox' shall be used to resolve the handler for that item.

In some embodiments, a 'hdlp' property may be essential. In other embodiments, the 'hdlp' property may be non-essential. It may be desirable to make 'hdlp' a non-essential property if backwards-compatibility is required. In an embodiment, 'hdlp' may be 4 character code for 'HandlerProperty'.

In another embodiment, each item may be associated with a particular item property which may indicate the exact handler type (for example, using a four-character to code) to use for that particular item. In an another embodiment, item handler type may be defined as follows:

```
aligned(8) class HandlerProperty extends ItemFullProperty('hdlt',
version, flags)
{
  unsigned int(32) handler_type;
}
```

'hdlt' property may be essential or non-essential property. It may be desirable to make it non-essential if backwards-compatibility is required. In an embodiment, 'hdlt' may be 4 character code for 'handler_type'.

In an embodiment, when a handler applies to a set of items, an entity group of a new type (e.g. 'hdlg') may be formed to enclose the set of items, and the 'hdlt' property may be associated with an entity group. In an embodiment, 'Mg' may be 4 character code for entity group. In an embodiment, the 'hdlg' group definition may use the following syntax:

```
aligned(8) class HandlerGroup extends EntityToGroupBox('hdlg',
version, flags)
{
  unsigned int(32) handler_type;
}
```

'HandlerGroup' provides a mapping of media handlers with specific items in a 'MetaBox'. 'HandlerGroup' may be used to provide an association of items and media handlers when a media handler applies to a set of items.

handler_type is a 4CC code which corresponds to a media handler type.

In another embodiment, the first entity listed in the HandlerGroup may be the primary item for the handler_type of the HandlerGroup.

Extending the HandlerBox to Indicate Compatible Handler Types:

In this embodiment, HandlerBox may be extended by utilizing ISOBMFF box extension mechanisms such as version or flags. In the example below, a flags-based extension in order to indicate a list of compatible handlers to which the structure or format of the 'Meta Box' also conforms is shown. In the following example, the syntax that is bolded has been added to the ISOBMFF syntax:

```
aligned(8) class HandlerBox extends FullBox('hdlr', version = 0, flags) {
   unsigned int(32)pre_defined = 0;
   unsigned int(32)handler_type;
   const unsigned int(32)[3]   reserved = 0;
   utf8string   name;
   if (flags & 1) {
   unsigned int(16) num_compatible_handlers;
   for (i=1; i <= num_compatible_handlers; i++)
      unsigned int(32) compatible_handler_type[i];
   }
}
```

In an embodiment, a character string (e.g. utf8string) of the name of a compatible handler may also be included within the loop.

OTHER EMBODIMENTS

In an embodiment, in order to indicate the primary item for compatible handlers, handler types or brands may have requirements of which kind of an item is set as the primary item in 'PrimaryItemBox'. Thus, when a 'Meta Box' is compatible with multiple handlers, a primary item for each handler may need to be indicated.

In an embodiment, a flags field (e.g., (flags & 1) equal to 1) of the 'HandlerProperty' may be used to indicate that the item is the primary item for the indicated handler type.

In another embodiment, when an entity group is used to indicate a handler for a set of items and (flags & 1) is equal to 1 in the entity group box, the first listed item may be defined to be the primary item for the set.

In another embodiment, 'HandlerExtensionBox' or the extension of a 'HandlerBox' may contain an item ID of the primary item. An example, for the extension of the 'HandlerBox' is provided below. In the following example, the syntax that is bolded has been added to the ISOBMFF syntax.:

```
aligned(8) class HandlerBox extends FullBox('hdlr', version = 0, flags) {
   unsigned int(32)pre_defined = 0;
   unsigned int(32)handler_type;
   const unsigned int(32)[3]   reserved = 0;
   utf8string  name;
   if (flags & 1) {
   unsigned int(16) num_compatible_handlers;
   for (i=1; i <= num_compatible_handlers; i++) {
      unsigned int(32) compatible_handler_type[i];
      if (flags & 2) unsigned int(32) primary_item_id[i];
   }
   }
}
```

Indicating the Presence and Usage of the Extended Type Box

A new 'combination' brand 'hdle' may be specified to indicate that a file contains aforementioned extensions to handler signaling. For example, a file may be intended for HEIF with 'pict' handler type in the 'HandlerBox', and thus use 'mif1' and other HEIF brands in the 'FileTypeBox'. If the file also conforms to another handler type, a brand of that handler type may be included together with 'hdle' in a 'TypeCombinationBox' of 'ExtendedTypeBox'.

Referring now to FIG. 3, the operations performed, such as by the apparatus 20 of FIG. 2 as embodied, for example, by a source 12, e.g., a server, of the media data and associated metadata are depicted. As shown in block 32, the apparatus includes means, such as the processing circuitry 22, for overloading media type definitions in an instance a plurality of media type definitions is present in compatible media type list. A media type definition is associated with a media type. For example, the processing circuitry may cause overloading of compatible brand definitions, when multiple brand definitions are present in the compatible brands list. In this embodiment, the compatible media type definition list includes a compatible brands list.

In an embodiment, to overload the compatible brand definitions, following operations may be performed:
define a new media type; and
list the new media type in the list of compatible media types when such a new media type indicates the presence of media entity-wise (e.g. item or track) media handler types, where such media types are signaled as 4 character codes, and where such media types can be brands and listed in compatible brands list.

As shown in block 34 of FIG. 3, the apparatus 20 includes means, such as the processing circuitry 22 or the like, for indicating, using the compatible media type list, presence of a plurality of media types in a metadata or multimedia box. In an embodiment, the presence of multiple brands in the compatible brands list may indicate present of different media types in the 'meta box'. the metadata or the multimedia box comprises a 'meta box'.

In an embodiment, the apparatus 20, such as the processing circuitry 22, is further caused to perform processing the plurality of media types based on a media type handler. For example, the media type handler needs to be configured as a 'super set' media type handler (e.g. include information about different media types) in order to properly process media items in the 'meta box'.

Referring now to FIG. 4, the operations performed, such as by the apparatus 20 of FIG. 2 as embodied, for example, by the source 12, e.g., a server, of the media data and associated metadata are depicted. As shown in block 42, the apparatus includes means, such as the processing circuitry 22, for defining a media type handler extension box for extending a number of media types. The media type handler extension box comprises a list of media type to which content of a metadata or a multimedia box complies with. For example, a new box called a 'HandlerExtensionBox' is defined to extend the number of possible media handlers. In this embodiment, the media type extension box includes the 'HandlerExtensionBox'. The 'HandlerExtensionBox' may be defined as follows:

```
aligned(8) class HandlerExtensionBox extends FullBox('hdle',
   version = 0, 0)
{
   HandlerBox[ ];
}
```

Where HandlerBox is defined as follows (same as in ISO/IEC 14496-12):

```
aligned(8) class HandlerBox extends FullBox('hdlr', version = 0, 0)
{
```

```
    unsigned int(32)   pre_defined = 0;
    unsigned int(32)handler_type;
    const unsigned int(32)[3]   reserved = 0;
    utf8string   name;
}
```

In an embodiment, 'HandlerExtensionBox' box may indicate a list of handlers which the contents of the 'meta box' comply with. In this embodiment, 'hdle' may be defined as a four character code for 'HandlerExtensionBox', and the list of media type includes the list of handlers.

In an embodiment, a box may be a basic building block of a multimedia file format.

As shown in block 44 of FIG. 4, the apparatus 20 also includes means, such as the processing circuitry 22, for defining a first media type handler for identifying the media type handler extension box and causing processing of media items based on the list of media types. In this embodiment, there may be a main meta box handler, that may recognize the 'hdle' box and then get ready to process items which may need to be handled more properly by the listed handlers. In this embodiment, the first media type handler includes the main meta box handler.

Referring now to FIG. 5, the operations performed, such as by the apparatus 20 of FIG. 2 as embodied, for example, by a source 12, e.g., a server, of the media data and associated metadata are depicted. As shown in block 52, the apparatus includes means, such as the processing circuitry 22, for associating a media item with a media item property. In an embodiment, the media item property includes 'HandlerProperty', which is defined as following:

```
    aligned(8) class HandlerProperty extends ItemFullProperty('hdlp',
    version, flags)
    {
      unsigned int handler_index;
    }
```

In an embodiment, four character code, for example, 'hdlp' may be used to define the 'HandlerProperty'. In some embodiments, the 'hdlp' property may be essential. In other embodiments, the 'hdlp' property may be non-essential property. It may be desirable to make the 'hdlp' property non-essential if backwards-compatibility is required.

As shown in block 54 of FIG. 5, the apparatus 20 also includes means, such as the processing circuitry 22, for signaling the media type using the media item property. In an embodiment, the four character code is used for defining the media item property.

In an embodiment, the apparatus 20, such as the processing circuitry 22, is further caused to perform defining a media type index for indicating an index of a media type handler box in a media type handler extension box. In an embodiment, the media type index includes a 'Handler_Index'. For example, 'handler_index' indicates the index of the 'HandlerBox' in the 'hdle' box.

In an embodiment, the apparatus 20, such as the processing circuitry 22, is further caused to perform resolving a media type for the media item by using a media type handler box associated with a metadata or multimedia box in an instance the media item property is not associated with the media item. For example, if the media item property is not associated to the media item via item-property association mechanism (having four character code as 'ipma'), then the 'meta box' level 'HandlerBox' may be used to resolve the handler for the media item. In an embodiment, the index starts from a value of 1, and an index value of 0 indicates resolving the media item by using the media type handler box associated with a metadata or multimedia box. For example, a value of 0 indicates the 'HandlerBox' at 'meta box' level. In an embodiment, the media type handler box associated with metadata of multimedia box comprises a 'meta box' level 'HandlerBox', and the metadata or multimedia box comprises the 'meta box'.

In another embodiment, each media item may be associated with a particular item property which may indicate the exact handler type (four-character to code) to use for that particular item. In an embodiment, the hander type may be defined using following syntax:

```
    aligned(8) class HandlerProperty extends ItemFullProperty('hdlt',
    version, flags)
    {
      unsigned int(32) handler_type;
    }
```

In an embodiment, 'hdlt' property may be essential property. In an embodiment, 'hdlt' is four character code for handler type. In another embodiment, the 'hdlt' property may be non-essential property. It may be desirable to make in non-essential backwards-compatibility is required.

In an embodiment, 'hdlp' may use the handler index for referencing the media handler while 'hdlt' may directly use the handler type 4CC code, which eliminates the need for an index based mechanism.

In an embodiment, the apparatus 20, such as the processing circuitry 22, is further caused to perform, in an instance the media type is associated with a set of media items, forming an entity group comprising the set of media items and associating the media item property to the entity group. For example, when a handler applies to a set of items, an entity group of a new type (e.g. using four character code 'hdlg') may be formed to enclose the set of items, and the 'hdlt' property may be associated with an entity group. In an embodiment, the 'hdlg' group definition may use the following syntax:

```
    aligned(8) class HandlerGroup extends EntityToGroupBox('hdlg',
    version, flags)
    {
      unsigned int(32) handler_type;
    }
```

In an embodiment, the primary item for the handler_type indicated in a HandlerGroup is specified to be the first entity listed within the HandlerGroup.

Referring now to FIG. 6, the operations performed, such as by the apparatus 20 of FIG. 2 as embodied, for example, by the source 12, e.g., a server, of the media data and associated metadata are depicted. As shown in block 62, the apparatus includes means, such as the processing circuitry 22, for extending a media type handler box using extension mechanisms. In an embodiment, the extension mechanisms include ISOBMFF mechanisms, which in turn includes a version or flags.

As shown in block 64 of FIG. 6, the apparatus 20 also includes means, such as the processing circuitry 22, for indicating, using the extended media type handler box, a list of compatible media types to which a structure or a format of a metadata or multimedia box conforms. Example of compatible media types include, but are not limited to, compatible handlers.

For example, the 'HandlerBox' may be extended by utilizing ISOBMFF box extension mechanisms such as version or flags. In the example below, a flags-based extension in order to indicate a list of compatible handlers to which the structure or format of the 'MetaBox' also conforms is shown. In the following example, the syntax that is bolded has been added to the ISOBMFF syntax.:

```
aligned(8) class HandlerBox extends FullBox('hdlr', version = 0, flags)
{
    unsigned int(32)   pre_defined = 0;
    unsigned int(32)   handler_type;
    const unsigned int(32)[3]   reserved = 0;
    utf8string   name;
    if (flags & 1)
    {
        unsigned int(16) num_compatible_handlers;
        for (i=1; i <= num_compatible_handlers; i++)
            unsigned int(32) compatible_handler_type[i];
    }
}
```

In an embodiment, a character string (e.g. utf8string) of the name of a compatible handler may also be included within the loop.

In an embodiment, the apparatus 20, such as the processing circuitry 22, is further caused to perform setting a primary media item for a compatible media type from a list of compatible media types and indicating the primary media item for the compatible media types. The primary media item may be set in a primary media item box, for example, 'PrimaryItemBox'. In an embodiment, in order to indicate the primary item for compatible handlers, handler types or brands may have requirements of which kind of an item is set as the primary item in 'PrimaryItemBox'. Thus, when a 'MetaBox' is compatible with multiple handlers, a primary item for each handler may need to be indicated. In an embodiment, the apparatus 20, such as the processing circuitry 22, is further caused to perform using flag fields of a media type property, for example, 'HandlerProperty' may be used to indicate a media item as the primary media item for a media type, for example a handler type. For example, the flags field (e.g., (flags & 1) equal to 1) of the 'HandlerProperty' may be used to indicate that the item is the primary item for the indicated handler type.

In an embodiment, the apparatus 20, such as the processing circuitry 22, is further caused to perform setting a flag in an entity group as '1' in an instance the entity group is used to indicate a media type for a set of media items. In an embodiment, the apparatus 20, such as the processing circuitry 22, is further caused to perform: defining a first media item listed in the set of media items as a primary media item for the set of media items. For example, when an entity group is used to indicate a handler for a set of items and (flags & 1) is equal to 1 in the entity group box, the first listed item may be defined to be the primary item for the set. In an embodiment, the extended media type handler box, for example, 'HandlerExtensionBox' or an extension of the 'HandlerBox' for storing the media type includes a media item identity of the primary media item. An example of the extension of the 'HandlerBox' is provided below. In the following example, the syntax that is bolded has been added to the ISOBMFF syntax.:

```
aligned(8) class HandlerBox extends FullBox('hdlr', version = 0, flags) {
    unsigned int(32)pre_defined = 0;
    unsigned int(32)handler_type;
    const unsigned int(32)[3]   reserved = 0;
    utf8string   name;
    if (flags & 1) {
        unsigned int(16) num_compatible_handlers;
        for (i=1; i <= num_compatible_handlers; i++) {
            unsigned int(32) compatible_handler_type[i];
            if (flags & 2) unsigned int(32) primary_item_id[i];
        }
    }
}
```

In an embodiment, the apparatus 20, such as the processing circuitry 22, is further caused to perform: defining a data structure for example, 'TypeCombinationBox', for indicating that a file comprises the extended media type handler, for example 'ExtendedTypeBox'. In an example, a new 'combination' brand 'hdle' may be specified to indicate that a file contains aforementioned extensions to handler signaling. For example, a file may be intended for HEIF with 'pict' handler type in the 'HandlerBox', and thus use 'mif1' and other HEIF brands in the 'FileTypeBox'. If the file also conforms to another handler type, a brand of that handler type may be included together with 'hdle' in a 'TypeCombinationBox' of 'ExtendedTypeBox'.

Referring now to FIG. 7, the operations performed, such as by the apparatus 20 of FIG. 2 as embodied, for example, by the source 12, e.g., a server, of the media data and associated metadata are depicted. As shown in block 72, the apparatus includes means, such as the processing circuitry 22, for forming an entity group including a set of media items, in an instance a media type is associated with the set of media items. For example, when a handler applies to a set of items, an entity group of a new type (e.g. using four character code 'hdlg') may be formed to enclose the set of items, and the 'hdlt' property may be associated with an entity group. In an embodiment, the 'hdlg' group definition may use the following syntax:

```
aligned(8) class HandlerGroup extends EntityToGroupBox('hdlg',
    version, flags)
{
    unsigned int(32) handler_type;
}
```

As shown in block 74 of FIG. 7, the apparatus 20 also includes means, such as the processing circuitry 22, for associating the entity group with a media item property, where the media item property indicates the media type to be used for the entity group or the set media items.

In an embodiment, the media item property includes 'HandlerProperty', which is defined as following:

```
aligned(8) class HandlerProperty extends ItemFullProperty('hdlp',
    version, flags)
{
    unsigned int handler_index;
}
```

In an embodiment, four character code, for example, 'hdlp' may be used to indicate the 'HandlerProperty'. In some embodiments, the 'hdlp' property may be essential. In other embodiments, the 'hdlp' property may be non-essential property. It may be desirable to make the 'hdlp' property non-essential if backwards-compatibility is required.

As shown in block 76 of FIG. 7, the apparatus 20 also includes means, such as the processing circuitry 22, for signaling the media type using the media item property. In an embodiment, the four character code is used for indicating the media item property.

In an embodiment, the apparatus 20, such as the processing circuitry 22, is further caused to perform defining a media type index for indicating an index of a media type handler box in a media type handler extension box. In an embodiment, the media type index includes a 'Handler_Index'. For example, 'handler_index' indicates the index of the 'HandlerBox' in the 'hdle' box.

In an embodiment, the apparatus 20, such as the processing circuitry 22, is further caused to perform resolving a media type for the set of media items by using a media type handler box associated with a metadata or multimedia box in an instance the media item property is not associated with the set of media items. For example, if the media item property is not associated with the set of media items via item-property association mechanism (having four character code as 'ipma'), then the 'meta box' level 'HandlerBox' may be used to resolve the handler for the set of media items. In an embodiment, the index starts from a value of 1, and an index value of 0 indicates resolving the media type for the set of media items by using the media type handler box associated with a metadata or multimedia box. For example, a value of 0 indicates the 'HandlerBox' at 'meta box' level. In an embodiment, the media type handler box associated with metadata of multimedia box comprises a 'meta box' level 'HandlerBox', and the metadata or multimedia box comprises the 'meta box'.

In another embodiment, each media item may be associated with a particular item property which may indicate the exact handler type (four-character to code) to use for that particular item. In an embodiment, the hander type may be defined using following syntax:

```
aligned(8) class HandlerProperty extends ItemFullProperty('hdlt',
    version, flags)
{
    unsigned int(32) handler_type;
}
```

In an embodiment, 'hdlt' property may be essential property. In an embodiment, 'hdlt' is four character code for handler type. In another embodiment, the 'hdlt' property may be non-essential property. It may be desirable to make in non-essential backwards-compatibility is required.

In an embodiment, 'hdlp' may use the handler index for referencing the media handler while 'hdlt' may directly use the handler type 4CC code, which eliminates the need for an index based mechanism.

Referring now to FIG. 8, the operations performed, such as by the apparatus 20 of FIG. 2 as embodied, for example, by the source 12, e.g., a server, of the media data and associated metadata are depicted. As shown in block 82, the apparatus includes means, such as the processing circuitry 22, for forming a plurality of sets of media items based on a plurality of media types associated with the plurality of sets of media items, where a media type is associated with each set of media items of the plurality of media items. For example, a distinct media type may be associated with each set of media items. Accordingly, there may be a plurality of sets of media items, where each set is associated with a different media type. For example, media items associated with a first media type may form a first set of media items, media items associated with a second media type may form a second set of media items, and the like. Accordingly, if there are 'N' number of media types, there may be 'N' number of sets of media items.

In an embodiment, a plurality of entity groups includes the plurality of sets of media, where each entity group includes a distinct set of media items of the plurality of media sets. In an example where there are 'N' number of sets of media items, there may be 'N' number of entity groups. An entity group is formed in an instance a media type is associated with a set of media item. For example, when a media item or handler applies to a set of items, an entity group of a new type (e.g. using four character code 'hdlg') may be formed to enclose the set of items, and the 'hdlt' property may be associated with an entity group. In an embodiment, the 'hdlg' group definition may use the following syntax:

```
aligned(8) class HandlerGroup extends EntityToGroupBox('hdlg',
    version, flags)
{
    unsigned int(32) handler_type;
}
```

As shown in block 84 of FIG. 8, the apparatus 20 also includes means, such as the processing circuitry 22, for associating a plurality of media item properties with the plurality of sets of media items, where a media item property is associated with the each set of media items. The media item property indicates the media type to be used for the each set of media items. In an example, each set of media items is associated with a distinct media item property, and the distinct media item property indicates a distinct media type to be used for the set of media items. For example, a first media property may be associated with a the first set of media items, a second media property may be associated with a the second set of media items, and the like. Accordingly, if there are 'N' number of media types, there may be 'N' number of media property (e.g. a distinct media property for each set of media items or each entity group).

In an embodiment, the media item property includes 'HandlerProperty', which is defined as following:

```
aligned(8) class HandlerProperty extends ItemFullProperty('hdlp',
    version, flags)
{
    unsigned int handler_index;
}
```

In an embodiment, four character code, for example, 'hdlp' may be used to indicate the 'HandlerProperty'. In some embodiments, the 'hdlp' property may be essential. In other embodiments, the 'hdlp' property may be non-essential property. It may be desirable to make the 'hdlp' property non-essential if backwards-compatibility is required.

As shown in block 86 of FIG. 8, the apparatus 20 also includes means, such as the processing circuitry 22, for signalling the plurality of media types using the plurality of media item. For example, a distinct media type is signaled via each media item property of the plurality of media item properties. In an embodiment, the four character code is used for indicating a media item property.

In an embodiment, the apparatus 20, such as the processing circuitry 22, is further caused to perform defining a media type index for indicating an index of a media type handler box in a media type handler extension box. In an embodiment, the media type index includes a 'Handler_Index'. For example, 'handler_index' indicates the index of the 'HandlerBox' in the 'hdle' box.

In an embodiment, the apparatus 20, such as the processing circuitry 22, is further caused to perform resolving the a media type for a set of media items using a media type handler box associated with a metadata or multimedia box in an instance the media item property is not associated with the set of media items. For example, if a media item property is not associated with a set of media items via item-property association mechanism (having four character code as 'ipma'), then the 'meta box' level 'HandlerBox' may be used to resolve the handler for the set of media items. In an embodiment, the index starts from a value of 1, and an index value of 0 indicates resolving the media type for the set of media items by using the media type handler box associated with a metadata or multimedia box. For example, a value of 0 indicates the 'HandlerBox' at 'meta box' level. In an embodiment, the media type handler box associated with metadata of multimedia box comprises a 'meta box' level 'HandlerBox', and the metadata or multimedia box comprises the 'meta box'.

In another embodiment, each set of media items may be associated with a particular item property which may indicate the exact handler type (four-character to code) to use for that particular set of media items. In an embodiment, the hander type may be defined using following syntax:

```
aligned(8) class HandlerProperty extends ItemFullProperty('hdlt',
version, flags)
{
    unsigned int(32) handler_type;
}
```

In an embodiment, 'hdlt' property may be essential property. In an embodiment, 'hdlt' is four character code for handler type. In another embodiment, the 'hdlt' property may be non-essential property. It may be desirable to make in non-essential backwards-compatibility is required.

In an embodiment, 'hdlp' may use the handler index for referencing the media handler while 'hdlt' may directly use the handler type 4CC code, which eliminates the need for an index based mechanism.

In an embodiment, a four character code may be used to indicate each media type of the plurality of media types or each media item property of the plurality of media item properties.

FIG. 9 is an example apparatus 900, which may be implemented in hardware, caused to implement the mechanism for signaling multiple media type 906, based on the examples described herein. For example the apparatus 900 may be caused to perform the methods as described in conjunction with FIGS. 3, 4, 5, and 6. The apparatus 900 comprises a processor 902, at least one non-transitory memory 904 including computer program code 905, wherein the at least one memory 904 and the computer program code 905 are configured to, with the at least one processor 902 cause the apparatus to implement the mechanism for signaling multiple media type 906, based on the examples described herein. The apparatus 900 optionally includes a display 908 that may be used to display content or media items. The apparatus 900 optionally includes one or more network (NW) interfaces (I/F(s)) 910. The NW I/F(s) 910 may be wired and/or wireless and communicate over the Internet/other network(s) via any communication technique. The NW I/F(s) 910 may comprise one or more transmitters and one or more receivers.

As described above, the method and apparatus 20 (or the apparatus 900) of example embodiments as well as a computer program product that may implement the foregoing methods upon execution provide for improvements in signaling multiple media type, for example, streamed from the source 12 to the client device 14.

As described above, FIGS. 3 to 8 include flowcharts of an apparatus 12, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 24 (or the memory 904) of an apparatus employing an embodiment of the present invention and executed by the processing circuitry 22 (or the processor 902) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 to 8. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    associating a media item with a media item property, wherein the media item property indicates a media handler to be used for the media item, wherein the media item comprises a non-timed media item; and
    signaling the media handler using the media item property.

2. The method of claim 1, further comprising defining a media handler index for indicating an index of a media type handler box in a media type handler extension box, wherein the media item property comprises, at least, the media handler index.

3. The method of claim 2, wherein the media handler index comprises a Handler_Index, wherein a meta box comprises the media item, wherein a media handler indicated with a media handler type of the meta box is different from the indicated media handler to be used for the media item.

4. The method of claim 1, further comprising resolving a further media handler for a further media item using a media type handler box associated with a metadata or multimedia box in an instance where the media item property is not associated with the further media item.

5. The method of claim 4, wherein an index of the media type handler box starts from a value of 1, and wherein an index value of 0 indicates resolving the media handler for the media item using the media type handler box associated with the metadata or multimedia box.

6. The method of claim 4, wherein the media type handler box associated with the metadata or multimedia box comprises a meta box level HandlerBox, and wherein the metadata or multimedia box comprises a meta box.

7. The method of claim 1 further comprising using a four character code to indicate one or more of: the media handler to use for the media item or the media item property.

8. The method of claim 1 further comprising:
    in an instance the media handler is associated with a set of media items, forming an entity group comprising the set of media items; and
    associating the media item property to the entity group.

9. An apparatus comprising:
    processing circuitry; and
    at least one memory storing instructions that, when executed by the processing circuitry, cause the apparatus at least to:
        associate a media item with a media item property, wherein the media item property indicates a media handler to be used for the media item, wherein the media item comprises a non-timed media item; and
        signal the media handler using the media item property.

10. The apparatus claim 9, wherein the at least one memory stores instructions that, when executed by the processing circuitry, cause the apparatus to:
    define a media handler index for indicating an index of a media type handler box in a media type handler extension box, wherein the media item property comprises, at least, the media handler index.

11. The apparatus of claim 10, wherein the media handler index comprises a Handler_Index.

12. The apparatus of claim 9, wherein the at least one memory stores instructions that, when executed by the processing circuitry, cause the apparatus to:
    resolve a further media handler for a further media item using a media type handler box associated with a metadata or multimedia box in an instance where the media item property is not associated with the further media item.

13. The apparatus of claim 12, wherein an index of the media type handler box starts from a value of 1, and wherein an index value of 0 indicates resolving the media handler for the media item using the media type handler box associated with the metadata or multimedia box.

14. The apparatus of claim 12, wherein the media type handler box associated with the metadata or multimedia box comprises a meta box level HandlerBox, and wherein the metadata or multimedia box comprises a meta box.

15. The apparatus of claim 9, wherein the at least one memory stores instructions that, when executed by the processing circuitry, cause the apparatus to:
    use a four character code to indicate one or more of:
    the media handler to use for the media item or the media item property.

16. The apparatus of claim 9, wherein the at least one memory stores instructions that, when executed by the processing circuitry, cause the apparatus to:
    in an instance the media handler is associated with a set of media items, form an entity group comprising the set of media items; and
    associate the media item property to the entity group.

17. A non-transitory computer readable medium comprising program instructions stored thereon for performing at least the following:
    associating a media item with a media item property, wherein the media item property indicates a media handler to be used for the media item, wherein the media item comprises a non-timed media item; and
    signaling the media handler using the media item property.

18. The non-transitory computer readable medium of claim 17, wherein the program instructions stored thereon are further for performing:
    resolving a further media handler for a further media item using a media type handler box associated with a metadata or multimedia box in an instance where the media item property is not associated with the further media item.

19. The non-transitory computer readable medium of claim 17, wherein in the program instructions stored thereon are further for performing:
    using a four character code to indicate one or more of: the media handler to use for the media item or the media item property.

20. The non-transitory computer readable medium of claim 17, wherein the program instructions stored thereon are further for performing:
    in an instance the media handler is associated with a set of media items, forming an entity group comprising the set of media items; and
    associating the media item property to the entity group.

\* \* \* \* \*